United States Patent
Alexander et al.

(10) Patent No.: US 8,972,666 B2
(45) Date of Patent: *Mar. 3, 2015

(54) MITIGATING CONFLICTS FOR SHARED CACHE LINES

(71) Applicant: International Business Machines Corporation, Armonk, NY (US)

(72) Inventors: Khary J. Alexander, Poughkeepsie, NY (US); Chung-Lung K. Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/095,340

(22) Filed: Dec. 3, 2013

(65) Prior Publication Data

US 2014/0164707 A1  Jun. 12, 2014

Related U.S. Application Data

(63) Continuation of application No. 13/523,453, filed on Jun. 14, 2012.

(51) Int. Cl.
*G06F 12/08* (2006.01)

(52) U.S. Cl.
CPC .............. *G06F 12/084* (2013.01); *G06F 12/08* (2013.01)
USPC ........... 711/130; 711/124; 711/150; 711/152; 711/E12.038

(58) Field of Classification Search
None
See application file for complete search history.

(56) References Cited

U.S. PATENT DOCUMENTS

| | | | |
|---|---|---|---|
| 5,361,368 A | 11/1994 | Herzl et al. |
| 5,819,105 A | 10/1998 | Moriarty et al. |
| 5,895,487 A | 4/1999 | Boyd et al. |
| 5,897,657 A | 4/1999 | Hagersten et al. |
| 6,625,701 B1 | 9/2003 | Arimilli et al. |
| 6,633,959 B2 | 10/2003 | Arimilli et al. |
| 6,725,334 B2 | 4/2004 | Barroso et al. |
| 6,738,871 B2 | 5/2004 | Van Huben et al. |
| 6,738,872 B2 | 5/2004 | Van Huben et al. |
| 6,865,645 B1 | 3/2005 | Shum et al. |

(Continued)

OTHER PUBLICATIONS

Moore et al, "Cached Sufficient Statistics for Efficient Machine Learning with Large Datasets", CMU-RI-TR-97-27, The Robotics Institute, Jul. 1997; pp. 1-23.

(Continued)

*Primary Examiner* — Michael Krofcheck

(74) *Attorney, Agent, or Firm* — Cantor Colburn LLP; Margaret McNamara

(57) ABSTRACT

A computer program product for mitigating conflicts for shared cache lines between an owning core currently owning a cache line and a requestor core. The computer program product includes a tangible storage medium readable by a processing circuit and storing instructions for execution by the processing circuit for performing a method. The method includes determining whether the owning core is operating in a transactional or non-transactional mode and setting a hardware-based reject threshold at a first or second value with the owning core determined to be operating in the transactional or non-transactional mode, respectively. The method further includes taking first or second actions to encourage cache line sharing between the owning core and the requestor core in response to a number of rejections of requests by the requestor core reaching the reject threshold set at the first or second value, respectively.

10 Claims, 5 Drawing Sheets

(56) References Cited

U.S. PATENT DOCUMENTS

| | | | |
|---|---|---|---|
| 6,963,953 B2 | 11/2005 | Nakajima | |
| 7,499,910 B2 | 3/2009 | Schneider et al. | |
| 8,032,709 B2 | 10/2011 | Shum et al. | |
| 2003/0126376 A1* | 7/2003 | Blankenship et al. | 711/141 |
| 2009/0204763 A1* | 8/2009 | Shum et al. | 711/119 |
| 2009/0216951 A1* | 8/2009 | Shum et al. | 711/130 |
| 2011/0296148 A1* | 12/2011 | Cain et al. | 712/228 |
| 2012/0166419 A1 | 6/2012 | Enoki et al. | |

OTHER PUBLICATIONS

Chakrabarti et al, "Method and System for Matching DOM Trees to Search Logs for Accurate Webpage Clustering", Technical Disclosure, Defensive Publication, Apr. 30, 2010, pp. 1-6.

Gururaj et al, "Method and System for Caching Metadata Associated with Complex Pathing Analysis Queries", Technical Disclosure, Defensive Publication, Oct. 14, 2010, pp. 1-7.

\* cited by examiner

MITIGATING CONFLICTS FOR SHARED CACHE LINES

CROSS REFERENCE TO RELATED APPLICATION

This application is a Continuation application that claims the benefit of priority of U.S. Non-Provisional application Ser. No. 13/523,453, which was filed on Jun. 14, 2012. The entire disclosure of U.S. Non-Provisional application Ser. No. 13/523,453 is incorporated herein by reference.

BACKGROUND

Embodiments relate to multi-processor environments, and more specifically, to a method for mitigating conflicts for shared cache lines to allow forward progress among processors in a multi-processor transactional execution environment.

In a multi-processing system, memory usage among different processors is managed based on various ownership states for a cache line. The states include read-only or shared and exclusive. In the read-only state, a certain processor has read access but not store access to a cache line. In a shared state, two or more processors may have read access to the cache line. In the exclusive state, a certain processor has the sole and explicit update rights to the cache line (i.e., "store access").

SUMMARY

According to exemplary embodiments, a computer program product is provided for mitigating conflicts for shared cache lines between an owning core that currently owns a cache line and a requestor core. The computer program product includes a tangible storage medium readable by a processing circuit and storing instructions for execution by the processing circuit for performing a method. The method includes determining whether the owning core is operating in a transactional mode or a non-transactional mode and setting a hardware-based reject threshold at a first value or a second value in response to determining that the owning core is operating in the transactional mode or the non-transactional mode, respectively. The method further includes taking a first action to encourage sharing of the cache line between the owning core and the requestor core in response to a number of rejections of requests by the requestor core reaching the reject threshold set at the first value with the owning core determined to be operating in the transactional mode, or taking a second action, which is different from the first action, to encourage sharing of the cache line between the owning core and the requestor core in response to a number of rejections of requests by the requestor core reaching the reject threshold set at the second value with the owning core determined to be operating in the non-transactional mode.

According to further exemplary embodiments, a computer system for mitigating conflicts for shared cache lines is provided. The system includes an owning core that currently owns a cache line, a requestor core and a hardware-based reject threshold. The system is configured to perform a method including determining, by a processor, whether the owning core is operating in a transactional mode or a non-transactional mode and setting a hardware-based reject threshold at a first value or a second value in response to determining that the owning core is operating in the transactional mode or the non-transactional mode, respectively. The method further includes taking a first action to encourage sharing of the cache line between the owning core and the requestor core in response to a number of rejections of requests by the requestor core reaching the reject threshold set at the first value with the owning core determined to be operating in the transactional mode, or taking a second action, which is different from the first action, to encourage sharing of the cache line between the owning core and the requestor core in response to a number of rejections of requests by the requestor core reaching the reject threshold set at the second value with the owning core determined to be operating in the non-transactional mode.

According to further exemplary embodiments, a computer implemented method for mitigating conflicts for shared cache lines between an owning core that currently owns a cache line and a requestor core is provided. The method includes determining, by a processor, whether the owning core is operating in a transactional mode or a non-transactional mode and setting a hardware-based reject threshold at a first value or a second value in response to determining that the owning core is operating in the transactional mode or the non-transactional mode, respectively. The method further includes taking a first action to encourage sharing of the cache line between the owning core and the requestor core in response to a number of rejections of requests by the requestor core reaching the reject threshold set at the first value with the owning core determined to be operating in the transactional mode, or taking a second action, which is different from the first action, to encourage sharing of the cache line between the owning core and the requestor core in response to a number of rejections of requests by the requestor core reaching the reject threshold set at the second value with the owning core determined to be operating in the non-transactional mode.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
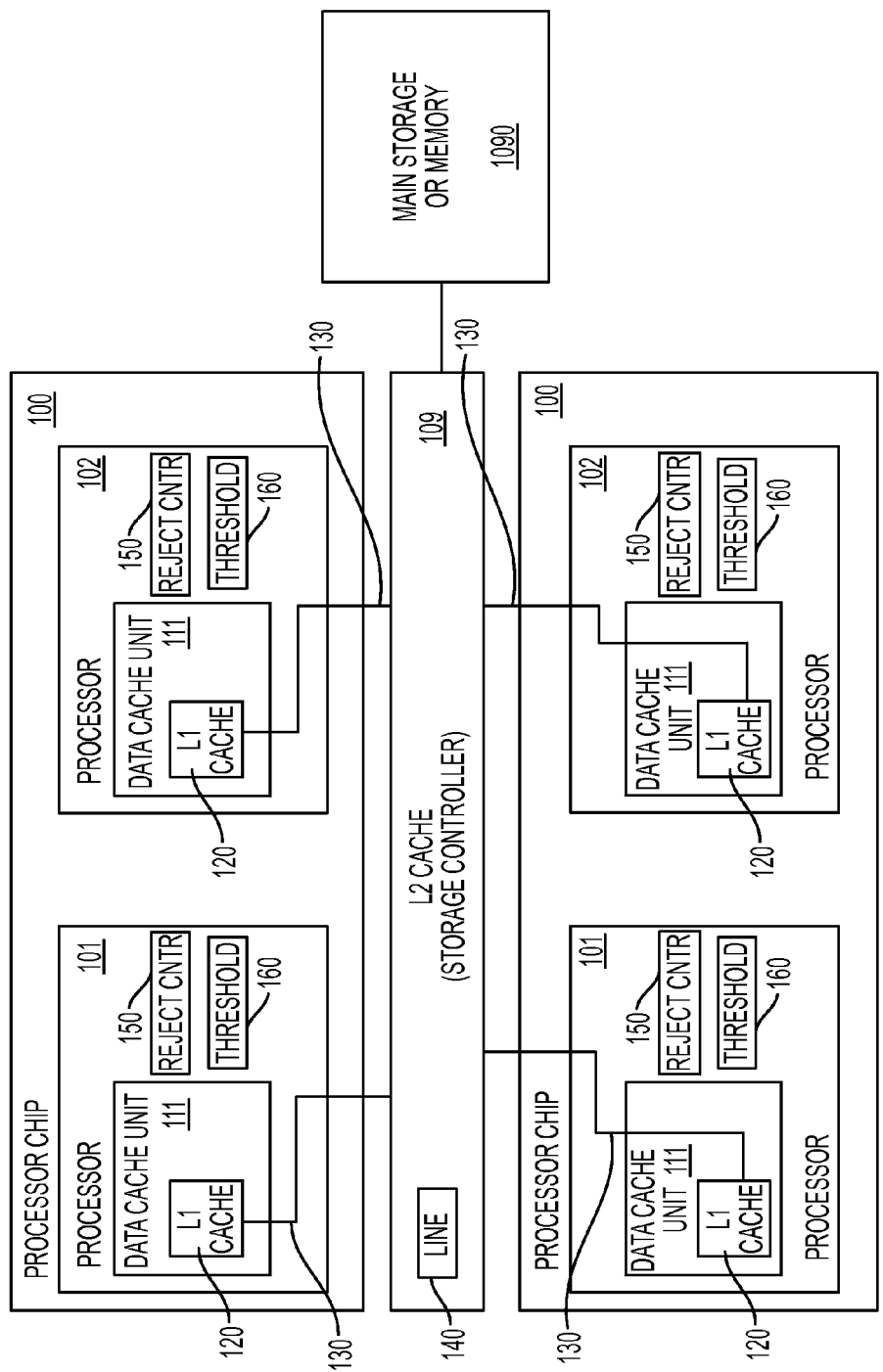
FIG. 1 illustrates a multi-processor system according to embodiments.

An exemplary embodiment mitigates conflicts for shared cache lines to allow for forward progress among processors in a multi-processor environment. When a requestor core (i.e., a "victim core") in the multi-processor environment desires exclusive access to a shared cache line that is assigned exclusively to an owning core (i.e., a "culprit core"), the requestor core initiates an ownership change request via a storage controller (SC). The SC issues a cross interrogate (XI) to the owning core to relinquish ownership. The owning core may reject the XI and retain control of the line. In an exemplary embodiment, a counter in the owning core is incremented in response to completing the first instruction following the XI reject. When the counter reaches a hardware-based reject threshold set at one of two values based on whether the owning core is operating in a first or transactional mode or a second or non-transactional mode, the owning core takes certain actions that allow the requestor core to access the line within a predetermined time.

In a multi-processing system, memory usage among different processors is managed based on various ownership states for a cache line. The states include read-only or shared and exclusive. In the exclusive state, a certain processor has the sole and explicit update rights to the cache line (i.e., "store access"). When a processor requests rights to execute a "store" instruction, the processor checks a local cache (L1) for the line's ownership state. If the processor discovers that the line is either currently shared or is not in its cache at all, the processor sends an "exclusive ownership request" to a storage controller (SC) which serves as a central coherency manager.

The SC tracks which processor, if any, currently owns the line exclusively. If deemed necessary, the SC will then send a specific "cross interrogate" (XI) or "ownership change" request to another processor which currently owns that line to release its exclusive rights. The XI is usually called an "exclusive XI". Once the processor that currently owns the line has responded to the XI and responded that the exclusive ownership is released, the requestor core is then given exclusive update rights to the line requested. It is also possible that the SC may find that one or more processors currently have the requested line in the read-only state. In such cases, the SC informs the owning core(s) through the XI interface indicating that the line is about to be changed. The owning core(s)' L1 logic ensures that data which currently exists in their caches is no longer consumed.

In a large Symmetric Multi-Processing (SMP) system, it is common that various processes running on different processors, or different threads within a processor, update or use the same cache lines, at similar times. When a process running on one processor references or updates a line that is currently owned exclusively by another processor, the owning core must acknowledge the exclusive XI and relinquish exclusive ownership before the first processor can access that line.

In some implementations, a processor may reject an exclusive XI request and retain exclusive access to that line, in which case the SC reprioritizes its pending requesters and resends the exclusive XI at a later time. In this case, it is important that the owning core cannot retain exclusive access to that line indefinitely, such that the other processors cannot be given rights to update or use the line and end up not making forward progress, a condition known as a "live-lock." The live-lock situation can result from a variety of situations in the owning core, including a long stream of updates to the line or a prefetch mechanism, which continually anticipates a need for exclusive access to the line.

In some prior processor designs, a processor is prevented from creating such a live-lock situation by requiring that it give up exclusive rights to a line as soon as possible after rejecting an exclusive XI, delaying this only until any pending updates are communicated to the memory controller (including any local caches). In particular, live-lock may be avoided by having an internal mechanism in the processor's cache control logic, which actively invalidates the line that had been the subject of a rejected XI as soon as possible. The mechanism may work as follows: when an exclusive XI is rejected, the address of the XI is saved in a register ("XI-save") and, at the same time, a record is made of all pending instructions within the processor. Any new instructions from this point on that request exclusive access to the same line as in the XI-save register are rejected. Once all instructions which were pending at the time of the XI reject have been completed, the processor invalidates the cache line corresponding to the address in the XI-save register. Following the invalidation, the XI-save register is reset and no longer inhibits access to the line by subsequent instructions such that the next such access will miss the cache (since the line has been invalidated) and cause a new request to be sent to the SC. By actively invalidating the line, the owning core guarantees that the repeated XI invalidate from the SC will be honored (not rejected). Even though this processor might be re-requesting the same line after the XI-save invalidation, the priority inside the SC ensures that the processor which had requested the line earlier gets access to the line first.

This design allows forward progress in all processors, but may not yield optimal performance. In particular, if a program on a processor currently owning exclusive rights to a line is in the midst of a (short but not seemingly endless) sequence of updates to that line when it receives the invalidation request, it will immediately need to re-acquire exclusive ownership of that line. Because of latency involved in transferring ownership among processors, this results in all of the processors involved in the contention spending extra time waiting. In addition, the resulting traffic on the multiprocessor coherence fabric can impact other processors in the SMP system. The mechanism also requires complex control sequencing, with significant inter-dependencies between the processor, its local cache and SC designs to insure correct operation in all cases.

Turning now to FIG. 1, a multi-processor system is depicted. It will be understood that the system includes other components and design units known in the art that are not depicted in FIG. 1. The system includes two processor chips 100 and a storage controller (SC) 109, which is coupled to a main storage or memory 1090 and which also serves as a level-2 (L2) cache. Each processor chip 100 includes two processors 101 and 102, which each further contain a data cache unit (DC) 111. Inside the DC 111, there is a level-1 (L1) data cache 120 for holding recently used cache lines.

Between the DC 111 and the SC 109, there are communication buses 130 that are configured for handling cache misses and XI requests. Although the system of FIG. 1 depicts a dedicated interface between the SC 109 and each DC 111, these interfaces may be shared among processors on processor chip 100. Upon a L1 data cache miss, the DC 111 sends a request through interface 130 to the L2 cache (which also serves as the SC) 109 indicating whether it needs a store access (exclusive) or a use access (read-only). The SC 109 returns requested data through interface 130 back to DC 111.

As an example, if a cache line 140 requested by processor 101 (i.e., the requestor core) is currently owned exclusively in processor 102 (i.e., the owning core), the SC 109 sends an exclusive XI to the DC 111 of processor 102. After the DC 111 of processor 102 receives the exclusive XI from SC 109, the DC 111 acknowledges the XI request if there is no store processing currently pending for line 140 in a pipeline (not depicted) of the processor 102. The DC 111 also invalidates exclusive ownership in its directory. Otherwise, the DC 111 of the processor 102 sends a XI reject indication through interface 130 back to the SC 109. Upon receiving the XI reject indication, the SC 109 reprioritizes its pending requests, and eventually resends the exclusive XI request for line 140 back to DC 111 of processor 102.

As discussed above, it is possible that processor 102 is running a program that is consistently storing into line 140. A possible live-lock can be created if, whenever the DC 111 receives the exclusive XI of line 140, the processor pipeline is also attempting to store or in the process of storing into line 140. This situation may result in a situation that processor 102 is running and completing instructions without any problem, but processor 101 is stuck waiting on the SC 109, which in turns waits on an exclusive XI acknowledgement from processor 102 by repeating the exclusive XI request for line 140.

Figure 2:
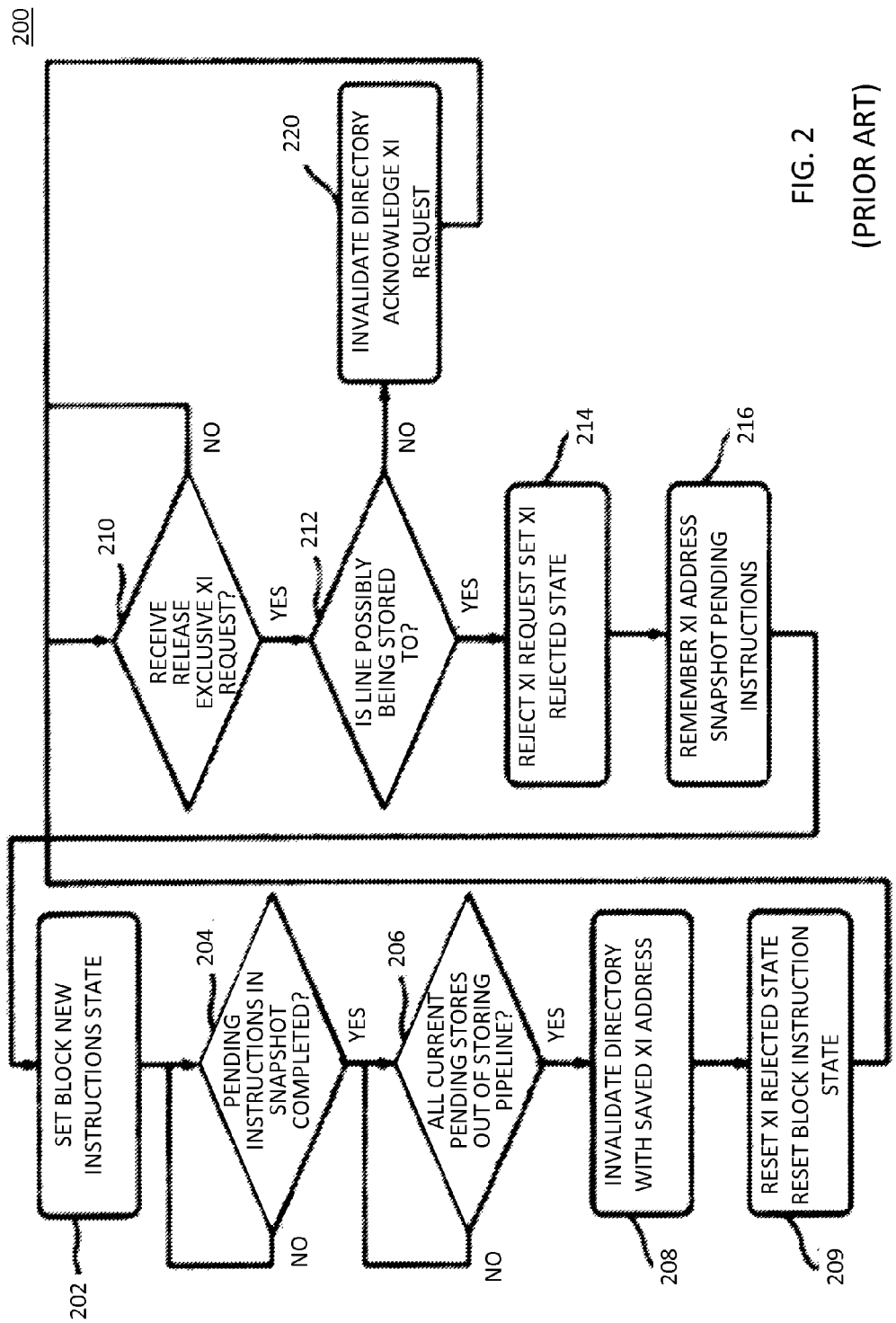
FIG. 2 illustrates a flow diagram of a process designed to avoid live-lock.

A conventional method of live-lock avoidance is described in reference to process 200 of FIG. 2. At block 210, when an exclusive XI is received by a processor (e.g., an owning core such as processor 102 of FIG. 1), a check is performed at block 212 if the requested line is currently being stored to, or anticipated to be stored to, and then an XI reject indication is sent to an SC at block 214. If, when an exclusive XI is processed, there is no store to the line in progress, the processor invalidates its directory to remove its exclusive ownership, and acknowledges to the SC that this has been done at block 220.

In the case that the processor rejects an XI, the processor saves the XI address into a XI-save register and arms its XI rejected state at block 216. At the same time, the processor records a "snapshot" of all pending instructions in the processor pipeline and sets a control state, which prevents newer instructions from entering into the pipeline at block 202. Only the instructions in the snapshot are then allowed to complete, and future instructions are either blocked or rejected. Once all instructions from the snapshot set are completed in block 204, the processor waits for all pending stores to be out of the storing pipeline at block 206. This is necessary because the storage update pipeline is longer than the processor execution pipeline. When all stores have been completed, the processor invalidates its directory with the address in the XI-save register at block 208. The processor then resets the "XI rejected" state, and also resets the control state that blocks new instructions at block 209. The processor then resumes normal instruction processing.

Figure 3:
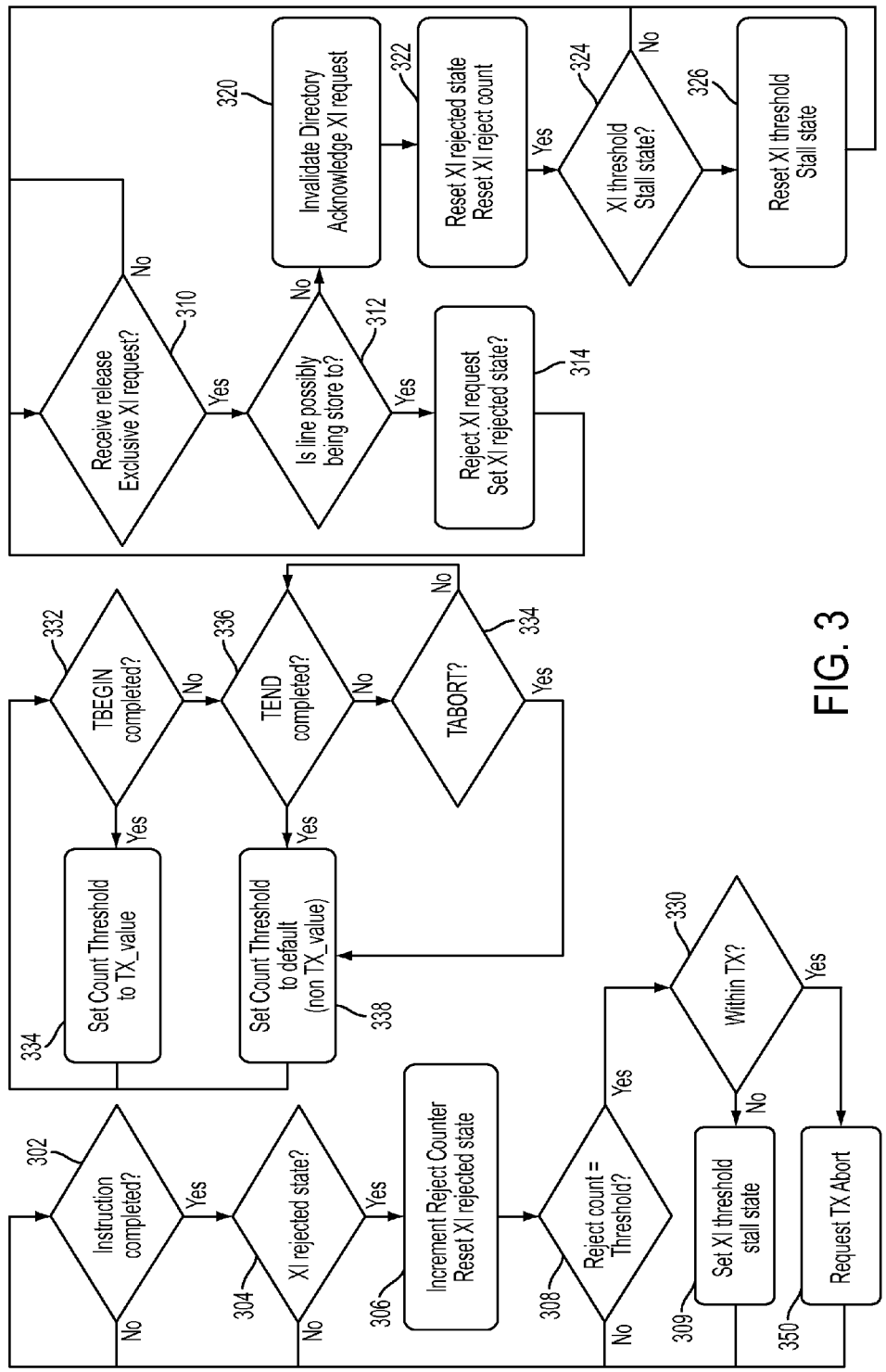
FIG. 3 illustrates a flow diagram of a process designed to avoid live-lock in accordance with embodiments.

Returning to FIG. 1, each processor 101 and 102 may include a reject counter 150 (also referred to as an XI reject counter 150) and a hardware-based reject threshold 160 for managing XI request rejection when the respective processor is an owning core. Here, the requests include at least one or more of read-only and exclusive requests for the cache line owned by the owning core. A process 300 for utilizing the XI reject counter 150 and the reject threshold 160 to stall or abort instruction processing and ensure forward progress in accordance with exemplary embodiments is depicted in FIG. 3 and described in reference to FIG. 1. At block 310, when processor 102 (i.e., a culprit core) receives an exclusive XI from say processor 101 (i.e., a victim core), if the requested line (e.g., line 140) is currently being stored to, or anticipated to be stored to, at block 312, an XI reject indication is sent to the SC 109 at block 314. If, when an exclusive XI is processed and no store to that line is in progress, the processor 102 updates its directory to remove its exclusive ownership, and acknowledges to the SC 109 that this has been done at block 320. This part is the processor 102's basic handling with its interface with the SC 109.

If an exclusive XI is rejected, a "XI rejected" control state is set at block 314. At block 302, whenever an instruction is completed, the "XI rejected" state is examined at block 304, and if set causes the XI reject counter 150 to be incremented, after which the "XI rejected" state is reset at block 306. A programmable transaction memory (TX) threshold value ("TX_value") is provided for use when the processor 102 is operating in a first or transactional memory mode as one of two values for the reject threshold 160 along with a non-TX threshold value ("non-TX_value"), which is provided for use when the processor 102 is operating in a second or non-transactional mode. If the XI reject counter 150 is determined to be equal to the reject threshold 160 at block 308 and the processor 102 is determined at block 330 to be operating in the second or non-transactional mode, a special pipeline stall control state ("XI threshold stall") is set at block 309. If, the XI reject counter 150 is determined to be equal to the reject threshold 160 at block 308 and the processor 102 is determined at block 330 to be operating in the first or transactional mode, the transactional operations of the processor 102 are aborted at block 350.

The stall state blocks any new instructions from being issued, and also blocks any prefetching from being attempted. The effect of this "XI threshold stall" state is that the processor 102 cannot attempt to store to any lines nor to acquire and hold exclusive access to any lines not already held. By blocking any new pipeline mechanism that might keep a line exclusive, the processor 102 is caused to honor an exclusive XI from the SC 109 (probably but not necessarily the one that was previously rejected). This is acknowledged by the processor 102 while the directory is being invalidated (see block 320) and guarantees that, once a processor reaches its preprogrammed XI reject threshold 160, another processor will have an opportunity to access the contended line and to make forward progress. If at any point an exclusive XI is acknowledged, the XI rejected control state will be reset as well as the XI reject counter 150 at block 322. At block 324, if the "XI threshold stall" control state is set, it will also be reset at block 326.

An abort of the operations of the processor 102 in the first or transactional mode is different from the stall state. In the first or transactional mode, the processor 102 may be executing for example a set of store instructions that often include a relatively large number of instructions as compared to operations in the non-transactional mode. Due to the need to complete such store instructions at one time, the operational footprint of the processor 102 is not drained until the transactional operations are resolved. Resolution of the transactional operations can be achieved by either completion of an ending instruction or by an abort of the transactional mode. In this way, it may be insured that when processor 102 operates in the first or transactional mode, processor 102 has a substantial opportunity to finish or complete transactional operations.

The determination of whether the processor 102 is operating in the first or transactional mode and therefore conducting a TX operation in block 330 is accomplished in accordance with the following procedure. At block 332, it is determined whether a TX beginning ("TBEGIN") instruction has been completed by the processor 102. If the TBEGIN instruction has been completed, it can be determined and inferred that the processor 102 is operating in the first or transactional mode and is therefore conducting a TX operation. At this point, control proceeds to block 334 with the reject threshold 160 readjusted to or set as the TX_value for use in block 308.

If the TBEGIN instruction has not been completed, control proceeds to block 336 at which point, it is determined whether a TX ending ("TEND") instruction has been completed. In a transactional mode, memory store operations may be buffered and are not committed to memory until the TEND instruction is executed. Thus, to other processors in a configuration, the transactional stores appear to be done simultaneously in a single memory operation. If the TEND instruction has been completed, it can be determined and inferred that the processor 102 is operating in the second or non-transactional mode and is therefore conducting a non-TX operation. Control thus proceeds to block 338 and the reject threshold 160 is readjusted to or set as a non-TX_value, which is provided as the other of the two reject thresholds 160, for use in block 308. If the TEND instruction has not been completed, control proceeds to block 340. At block 340, it is determined whether a TX abort ("TABORT") instruction has been requested. If, at block 340, it is determined that the TABORT instruction has not been requested, control reverts to block 336. On the other hand, if, at block 340, it is determined that the TABORT instruction has been requested, control proceeds to block 338.

Figure 4:
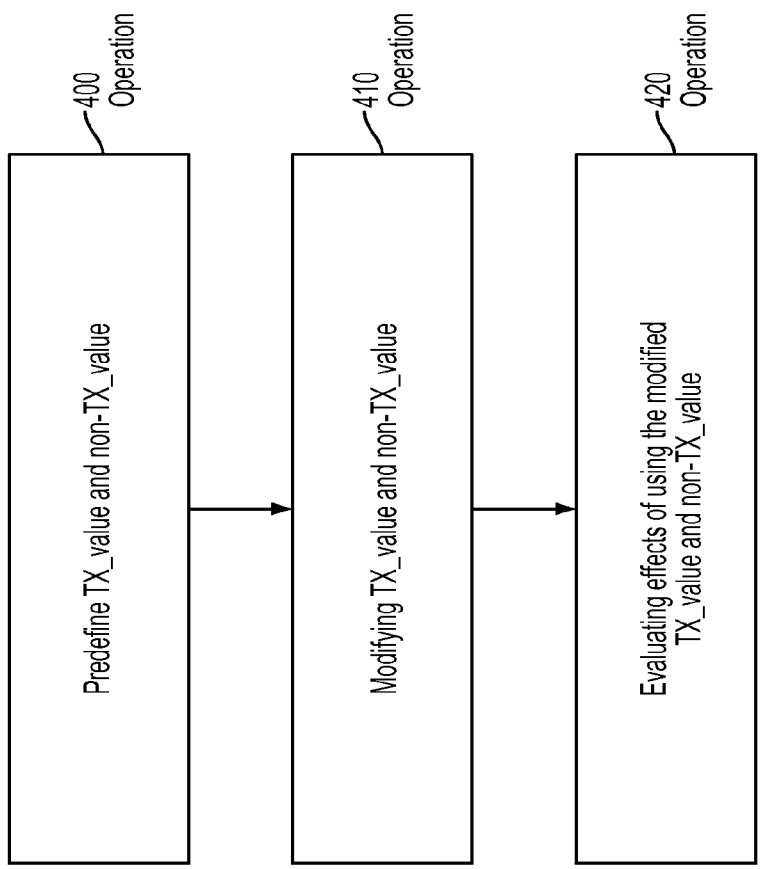
FIG. 4 is a flow diagram illustrating a method of dynamically adjusting values for a reject threshold.

A relatively small reject threshold 160 allows for a fast turnaround time to let other processors get access to a line currently owned exclusively but is still being used in an owning core. A relatively large reject threshold 160 allows the owning core to do more work before giving up the line 140 to avoid unnecessary cache line ping-pong, which involves delays in communicating among processors 101 and 102 and the SC 109. Generally, the TX_value will represent a larger threshold 160 as compared to the non-TX_value so that transactional operations will have a higher chance of completion prior to the reject threshold 160 being met. In any case, with reference to FIG. 4, both the TX_value and the non-TX_value can be at least initially set to predefined or preselected respective values (operation 400), but it is to be understood that both the TX_value and the non-TX_value can also be readjusted over time so that system performance can be fine-tuned to workload and cache and coherency schemes. Such readjustment may be dynamically achieved by modifying the TX-values and non-TX_values (operation 410) and evaluating or measuring effects of using the modified TX-values and non-TX_values for the reject threshold 160 (operation 420).

Embodiments can be extended for use in a system where the SC 109 is built with multiple parallel request pipelines and in a case where the SC design does not guarantee a repeat of a rejected XI, possibly because there is a cancel interface where the requestor core is canceling its original fetch request. Embodiments may also be extended to allow dynamic modification of the reject threshold 160 values based on recognition of specific program behavior or paradigms.

As will be appreciated by one skilled in the art, one or more aspects may be embodied as a system, method or computer program product. Accordingly, one or more aspects may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 5:
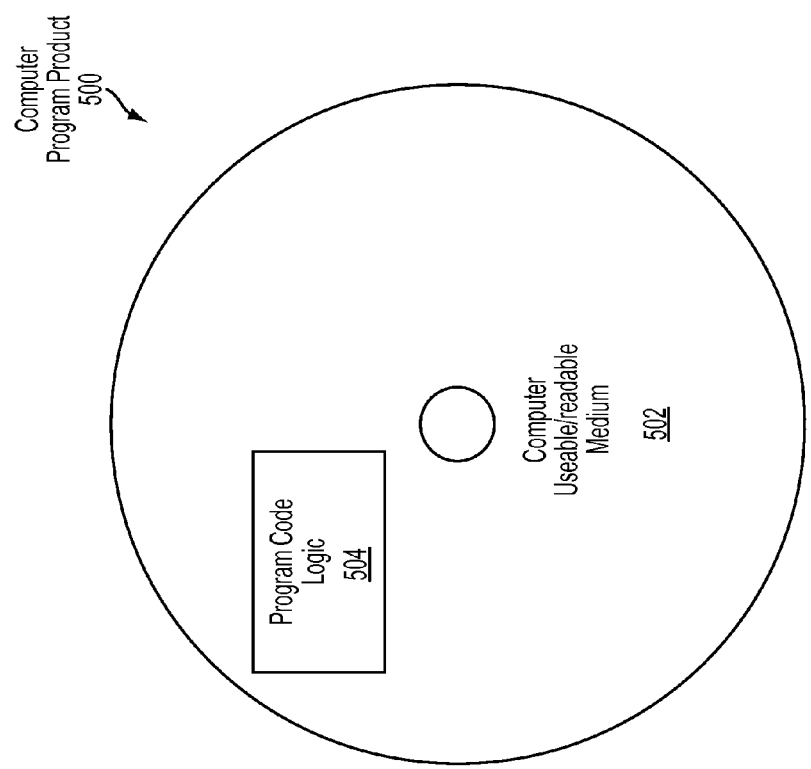
FIG. 5 illustrates a computer program product in accordance with an embodiment.

Referring now to FIG. 5, in one example, a computer program product 500 includes, for instance, one or more storage media 502, wherein the media may be tangible and/or non-transitory, to store computer readable program code means or logic 504 thereon to provide and facilitate one or more aspects of embodiments described herein.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of embodiments.

Embodiments include a method, system, and computer program product for mitigating conflicts for shared cache lines between an owning core that currently owns a cache line and a requestor core by determining whether the owning core is operating in a transactional or non-transactional mode, setting a hardware-based reject threshold at a first value with the owning core determined to be operating in the transactional mode or a second value with the owning core determined to be operating in the non-transactional mode and taking a first action to encourage sharing of the cache line between the owning core and the requestor core in response to a number of rejections of requests by the requestor core reaching the reject threshold set at the first value with the owning core determined to be operating in the transactional mode, or taking a second action, which is different from the first action, to encourage sharing of the cache line between the owning core and the requestor core in response to a number of rejections of requests by the requestor core reaching the reject threshold set at the second value with the owning core determined to be operating in the non-transactional mode.

In an embodiment, the requests include at least one or more of read-only and exclusive requests.

In an embodiment, the first value is higher than the second value.

In an embodiment, the numbers of rejections are counted.

In an embodiment, the taking of the first action comprises aborting owning core operations.

In an embodiment, the taking of the second action comprises initiating a stall state of the owning core.

In an embodiment, the reject threshold is readjusted to the second value in response to owning core operations in the transactional mode ending or being aborted.

In an embodiment, the first value and the second value are predetermined and readjusted.

Technical effects and benefits include mitigation of conflicts for shared cache lines to allow for forward progress among processors in a multi-processor environment. When a requestor core (i.e., a "victim core") in the multi-processor environment desires access to a shared cache line that is assigned exclusively to an owning core (i.e., a "culprit core"), the requestor core initiates an ownership change request via a storage controller (SC). The SC issues a cross interrogate (XI) to the owning core to relinquish ownership. The owning core may reject the XI and retain control of the line. In an exemplary embodiment, a counter in the owning core is incremented in response to completing the first instruction following the XI reject. When the counter reaches a hardware-based reject threshold set at one of two values based on whether the owning core is operating in a first or transactional mode or a second or non-transactional mode, the owning core takes certain actions that allow the requestor core to access the line within a predetermined time.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system for mitigating conflicts for shared cache lines, the system comprising:
    an owning core that currently owns a cache line, a requestor core and a hardware-based reject threshold, the system configured to perform a method comprising:
    determining, by a processor, whether the owning core is operating in one of a transactional mode and a non-transactional mode;
    setting a hardware-based reject threshold at a first value when the owning core is determined to be operating in the transactional mode and a second value when the owning core is determined to be operating in the non-transactional mode;
    taking a first action to encourage sharing of the cache line between the owning core the requestor core in response to a number of rejections of requests by the requestor core reaching the reject threshold set at the first value when the owning core is determined to be operating in the transactional mode; and
    taking a second action, which is different from the first action, to encourage sharing of the cache line between the owning core and the requestor core in response to a number of rejections of requests by the requestor core reaching the reject threshold set at the second value when the owning core is determined to be operating in the non-transactional mode.

2. The system according to claim 1, wherein the requests comprise at least one or more of read-only and exclusive requests and the system is further configured to count the number of request rejections.

3. The system according to claim 1, wherein the transactional mode begins with a beginning instruction and ends with an ending instruction and the system is further configured to delay memory stores until an end of the transactional mode.

4. The system according to claim 1, wherein the taking of the first action comprises aborting owning core operations and the taking of the second action comprises initiating a stall state of the owning core, the system being further configured to readjust the reject threshold to the first value in response to the owning core entering the transactional mode and to readjust the reject threshold to the second value in response to owning core operations in the transactional mode ending or being aborted.

5. The system according to claim 1, wherein the system is further configured to predefine the first value and the second value and to adjust the first value and the second value.

6. A computer system comprising an owning core that currently owns a cache line, a requestor core and a hardware-based reject threshold, the system being configured to:

determine, by a processor, whether the owning core is operating in one of a transactional mode and a non-transactional mode;

set the hardware-based reject threshold at a first value when the owning core is determined to be operating in the transactional mode and a second value when the owning core is determined to be operating in the non-transactional mode;

take a first action to encourage sharing of the cache line between the owning core and the requestor core in response to a number of rejections of requests by the requestor core reaching the reject threshold set at the first value; and taking a second action to encourage sharing of the cache line between the owning core and the requestor core in response to a number of rejections of requests by the requestor core reaching the reject threshold set at the second value.

7. The system according to claim 6, wherein the requests comprise at least one or more of read-only and exclusive requests and the system is further configured to count the number of request rejections.

8. The system according to claim 6, wherein the transactional mode begins with a beginning instruction and ends with an ending instruction and the system is further configured to delay memory stores until an end of the transactional mode.

9. The system according to claim 6, wherein the taking of the first action comprises aborting owning core operations and the taking of the second action comprises initiating a stall state of the owning core, the system being further configured to readjust the reject threshold to the first value in response to the owning core entering the transactional mode and to readjust the reject threshold to the second value in response to owning core operations in the transactional mode ending or being aborted.

10. The system according to claim 6, wherein the system is further configured to predefine the first value and the second value and to adjust the first value and the second value.

\* \* \* \* \*